United States Patent
Hao et al.

(10) Patent No.: US 11,611,422 B2
(45) Date of Patent: Mar. 21, 2023

(54) SUB-BAND-FULL-DUPLEX ADAPTIVE BASE STATION TRANSCEIVER

(71) Applicant: QUALCOMM Incorporated, San Diego, CA (US)

(72) Inventors: Charline Hao, San Diego, CA (US); Lida Akhoondzadehasl, Santa Clara, CA (US); Joseph Patrick Burke, San Diego, CA (US); Dai Lu, San Diego, CA (US); Muhammad Sayed Khairy Abdelghaffar, San Jose, CA (US); Allen Minh-Triet Tran, Rancho Santa Fe, CA (US); Shimman Arvind Patel, San Diego, CA (US); Tingfang Ji, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 17/086,368

(22) Filed: Oct. 31, 2020

(65) Prior Publication Data
US 2021/0135833 A1    May 6, 2021

Related U.S. Application Data

(60) Provisional application No. 62/929,853, filed on Nov. 2, 2019.

(51) Int. Cl.
*H04B 7/06* (2006.01)
*H04L 5/14* (2006.01)
*H04B 7/08* (2006.01)
*H04W 88/08* (2009.01)
*H04L 49/25* (2022.01)

(52) U.S. Cl.
CPC ............. *H04L 5/14* (2013.01); *H04B 7/0686* (2013.01); *H04L 49/25* (2013.01); *H04W 88/08* (2013.01)

(58) Field of Classification Search
CPC ........ H04L 5/14; H04W 88/08; H04B 7/0686; H04B 7/0691; H04B 7/0868; H04B 7/0874
See application file for complete search history.

(56) References Cited

U.S. PATENT DOCUMENTS

| | | |
|---|---|---|
| 2007/0021080 A1 | 1/2007 | Kuriyama et al. |
| 2018/0167191 A1 | 6/2018 | Liang et al. |
| 2020/0112355 A1* | 4/2020 | Park ..................... H04B 7/0626 |
| 2022/0140966 A1* | 5/2022 | Choi ................... H04L 27/2613 370/329 |

OTHER PUBLICATIONS

International Search Report and Written Opinion—PCT/US2020/058598—ISA/EPO—dated Mar. 30, 2021.
Partial International Search Report—PCT/US2020/058598—ISA/EPO—dated Feb. 8, 2021.

* cited by examiner

*Primary Examiner* — Kent Krueger
(74) *Attorney, Agent, or Firm* — Haynes and Boone, LLP

(57) ABSTRACT

A base station is disclosed that includes two separated antenna arrays. In a TDD mode of operation, both arrays are used for either transmit or receive. In a sub-band full-duplex mode of operation, one array is used to transmit downlink symbols while the remaining array is used to receive uplink symbols.

21 Claims, 12 Drawing Sheets during a downlink time division duplex (DL TDD) slot, up converting a first baseband signal using a first RF chain to form a first DL radio frequency (RF) signal and transmitting the first DL RF signal from a first sub-array of antennas and from a second sub-array of antennas, the first DL RF signal occupying a frequency band ~1000 during an uplink (UL) TDD slot, receiving a first UL RF signal using the first sub-array of antennas and the second sub-array of antennas and down converting the first UL RF signal using the first RF chain to form a second baseband signal, the first UL RF signal occupying the frequency band ~1005 during a first sub-band-full-duplex (SBFD) slot, up converting a third baseband signal using the first RF chain to form a second DL RF signal and transmitting the second DL RF signal only from the first sub-array of antennas, the second DL RF signal occupying a lower sub-band and an upper sub-band in the frequency band, the lower sub-band being separated in frequency from the upper sub-band by a central sub-band in the frequency band ~1010

FIG. 10

SUB-BAND-FULL-DUPLEX ADAPTIVE BASE STATION TRANSCEIVER

CROSS REFERENCE TO RELATED APPLICATION

The present application claims priority to U.S. Provisional Patent Application No. 62/929,853, filed Nov. 2, 2019, which is hereby incorporated by reference in its entirety.

TECHNICAL FIELD

This application relates to wireless communication, and more particularly to a sub-band-full-duplex adaptive base station transceiver.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is the $5^{th}$ Generation (5G) New Radio (NR). 5G NR is part of a continuous mobile broadband evolution promulgated by the Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further multiple-access improvements in 5G NR technology. These improvements may also be applicable to other multi-access technologies and the telecommunication standards that employ these technologies.

SUMMARY

A base station is disclosed that includes: a first array of antennas organized into a plurality of first sub-band full duplex (SBFD) sub-arrays of antennas; a second array of antennas organized into a plurality of second SBFD sub-arrays of antennas; a plurality of transmit RF chains, each transmit RF chain being configured to shift a baseband signal into an RF transmit signal, wherein the plurality of transmit RF chains have a one-to-one correspondence with the plurality of first SBFD sub-arrays of antennas; a plurality of receive RF chains, each receive RF chain being configured to shift a receive RF signal into a baseband signal, wherein the plurality of receive RF chains have a one-to-one correspondence with the plurality of second SBFD sub-arrays of antennas; and a plurality of switches having a first configuration for an SBFD mode of operation in which each transmit RF chain is configured to drive a respective first SBFD sub-array of antennas with the transmit RF chain's RF transmit signal and in which each receive RF chain is configured to receive the receive RF chain's receive RF signal from a respective second SBFD sub-array.

In addition, a base station is disclosed that includes: a first transmit RF chain; a first array of antennas including a first sub-band-full-duplex (SBFD) sub-array of antennas and a second SBFD sub-array of antennas; a first RF signal splitter and combiner; and a switching array configured to couple the transmit RF chain through the first RF signal splitter and combiner to both the first SBFD sub-array of antennas and to the second SBFD sub-array of antennas in a downlink time division duplex (DL TDD) mode of operation, the switching array being further configured to couple the first transmit RF chain to the first SBFD sub-array of antennas and not to the second SBFD sub-array of antennas in an SBFD mode of operation.

Finally, a method for a base station is disclosed that includes: during a downlink time division duplex (DL TDD) slot, up converting a first baseband signal using a first RF chain to form a first DL radio frequency (RF) signal and transmitting the first DL RF signal from a first sub-array of antennas and from a second sub-array of antennas, the first DL RF signal occupying a frequency band; during an uplink (UL) TDD slot, receiving a first UL RF signal using the first sub-array of antennas and the second sub-array of antennas and down converting the first UL RF signal using the first RF chain to form a second baseband signal, the first UL RF signal occupying the frequency band; and during a first sub-band-full-duplex (SBFD) slot, up converting a third baseband signal using the first RF chain to form a second DL RF signal and transmitting the second DL RF signal only from the first sub-array of antennas, the second DL RF signal occupying a lower sub-band and an upper sub-band in the frequency band, the lower sub-band being separated in frequency from the upper sub-band by a central sub-band in the frequency band.

These and other advantageous features may be better appreciated through the following detailed description.

BRIEF DESCRIPTION OF FIGURES

FIG. 10 is a flow chart for an example method of operation for an SBFD base station in accordance with an aspect of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
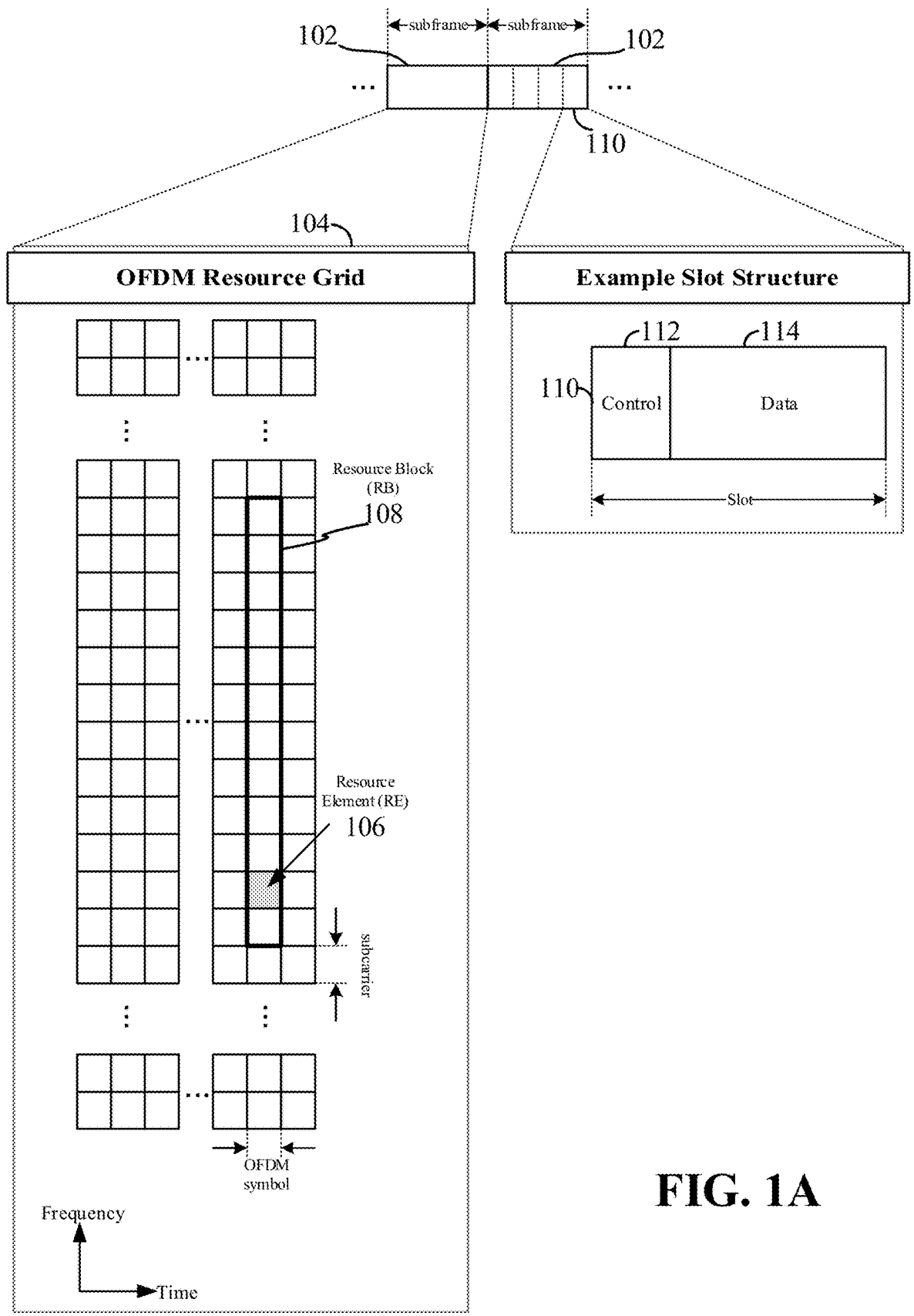
FIG. 1A illustrates some 5G NR time and frequency resources.

As compared to older communication standards, the spectrum options for 5G NR are considerably expanded. For example, the frequency range 2 (FR2) band extends from approximately 24 GHz to 60 GHz. Since the wavelength decreases as the frequency increases, the FR2 band is denoted as a millimeter wave band due to its relatively-small wavelengths. In light of this relatively short wavelength, the transmitted radio frequency (RF) signals in the FR2 band behave somewhat like visible light. Thus, just like light, millimeter-wave signals are readily shadowed by buildings and other obstacles. In addition, the received power per unit area of antenna element goes down as the frequency goes up. For example, a patch antenna element is typically a fraction of the operating wavelength (e.g, one-half of the wavelength) in width and length. As the wavelength goes down (and thus the size of the antenna element decreases), it may thus be seen that the signal energy received at the corresponding antenna element decreases. Millimeter-wave cellular networks will generally require a relatively-large number of base stations due to the issues of shadowing and decreased received signal strength. A cellular provider must typically rent the real estate for the base stations such that widespread coverage for a millimeter-wave cellular network may become very costly.

As compared to the challenges of FR2, the electromagnetic properties of radio wave propagation in the sub-6 GHz bands are more accommodating. For example, the 5G NR frequency range 1 (FR1) band extends from approximately 0.4 GHz to 7 GHz. At these lower frequencies, the transmitted RF signals tend to refract around obstacles such as buildings so that the issues of shadowing are reduced. In addition, the larger size for each antenna element means that a FR1 antenna element intercepts more signal energy as compared to an FR2 antenna element. Thus, just as was established for 4G and older networks, a 5G NR cellular network operating in the FR1 band will not require an inordinate amount of base stations. Given the favorable properties of the lower frequency bands, the sub-6 GHz bands are often denoted as "beachfront" bands due to their desirability.

One issue with operation in the sub-6 GHz bands is that there is only so much bandwidth available. For this reason, the Federal Communications Commission regulates the airwaves and conducts auctions for the limited bandwidth in the FR1 band. Given this limited bandwidth, it is challenging for a cellular provider to enable the high data rates that would be more readily achieved in the FR2 band. To meet these challenges, a "sub-band full duplex" (SBFD) network architecture is disclosed herein that is quite advantageous as it offers users the high data rates that would otherwise require usage of the FR2 band. But the SBFD network architecture disclosed herein provides these high data rates in the more FR1 band and thus lowers costs due to the smaller number of base stations per given area of coverage that may be achieved in the FR1 band as compared to the FR2 band.

To better appreciate the advantages of an SBFD network, some general 5G NR time and frequency resource structure such as for an orthogonal frequency division multiplexing (OFDM) waveform will be reviewed initially with reference to FIG. 1A. In some embodiments, transmissions are organized in the time domain into frames, with each frame consisting of 10 subframes of 1 ms each. An expanded view of two exemplary subframes 102 is shown in FIG. 1A. Each subframe 102 may be mapped to an OFDM resource grid 104. However, as those skilled in the art will readily appreciate, the PHY transmission structure for any particular application may vary from the example described here, depending on any number of factors. For OFDM resource grid 104, time is in the horizontal direction with units of OFDM symbols whereas frequency is in the vertical direction with units of subcarriers or tones.

The resource grid 104 may be used to schematically represent time-frequency resources for a given antenna port. That is, in a MIMO implementation with multiple antenna ports available, a corresponding multiple number of resource grids 104 may be available for communication. The resource grid 104 is divided into multiple resource elements (REs) 106. An RE, which is 1 subcarrier×1 symbol, is the smallest discrete part of the time-frequency grid, and contains a single complex value representing data from a physical channel or signal. A block of twelve consecutive subcarriers defined a resource block (RB) 108, which has an undefined time duration in the NR standard. In one implementation, resource block 108 extends over a symbol duration. A set of contiguous RBs 108 such as shown for resource grid 104 form a bandwidth part (BWP).

Each 1 ms subframe 102 may consist of one or multiple adjacent slots. In the example shown in FIG. 1A, one subframe 102 includes four slots 110, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 110 illustrates the slot 110 including a control region 112 and a data region 114. In general, the control region 112 may carry control channels and the data region 214 may carry data channels. A slot 110 may contain all downlink (DL), all uplink (UL), or at least one DL portion and at least one UL portion. The simple structure illustrated in FIG. 1A is merely exemplary in nature, and different slot structures may be utilized, and may include one or more of each of the control region(s) and data region(s).

An SBFD organization of these 5G NR time and frequency resources will now be discussed in more detail. This SBFD resource organization will be discussed with regard to a repeating four-slot structure as discussed previously but it will be appreciated that the subframe size may be greater or smaller than four slots in alternative implementations. In a traditional four-slot structure, the first two slots may be downlink slots whereas a final one of the fours slots is an uplink slot. The third slot is a special slot in which some symbols may be used for uplink transmissions and others for downlink transmissions. The resulting uplink and downlink traffic is thus time division duplexed (TDD) as arranged by the dedicated slots and as arranged by the symbol assignment in the special slot. Since the uplink has only a single dedicated slot, uplink communication may suffer from excessive latency since the user equipment (UE) is restricted to transmitting in the single dedicated uplink slot and in the resource allocations within the special slot. Since there is only one dedicated uplink slot in the repeating four-slot structure, the resulting latency can be problematic particularly for low-latency applications such as vehicle-to-vehicle communication. In addition, the energy for the uplink communication is limited by its single dedicated slot.

To reduce uplink latency and increase the energy for the uplink transmissions, a sub-band full duplex (SBFD) mode is proposed in which the second and third slots are SBFD slots modified to support frequency duplexing for simultaneous uplink and downlink transmissions. The first slot and the fourth slot may remain as legacy time division duplex (TDD) slots such that the first slot is still dedicated to downlink and the fourth slot dedicated to uplink. It will be appreciated, however, that any slot may be used in an SBFD mode in alternative embodiments.

In the sub-6 GHz spectrum, the relatively-limited separation between antennas on a handset will typically lead to substantial self-interference should the handset engage in a simultaneous uplink and downlink transmission. The frequency duplexing in the SBFD slots disclosed herein is thus practiced just by the base station transceiver (gNB) in some embodiments. In particular, an antenna array for the gNB is subdivided into a first antenna array that is separated from a second antenna array by an insulating distance such as, for example, 10 to 30 cm. During SBFD operation, one of the antenna arrays transmits while the other antenna array is receiving. The self-interference problem is partially addressed by the physical separation between the arrays. To provide additional isolation, a conducting shield between the arrays may also be implemented. It will be appreciated, however, that frequency duplexing may also be practiced by the handset (or more generally, a user equipment (UE)) should the handset practice sufficient self-interference cancellation. In other embodiments, however, the UE is limited to half-duplex transmission such that the UE's antenna array is entirely dedicated to just transmitting or to just receiving in respective slots.

Figure 1B:
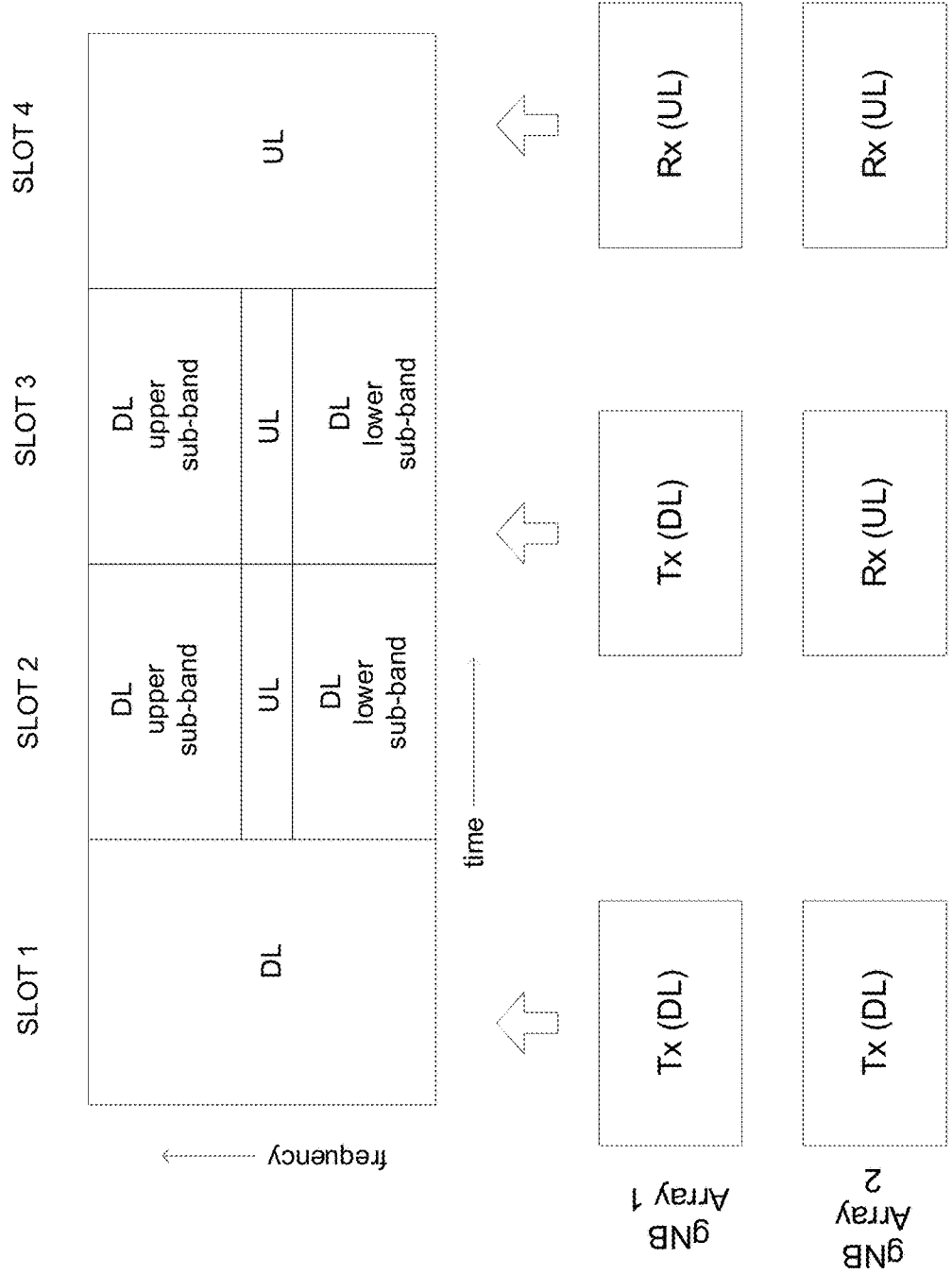
FIG. 1B illustrates a slot structure including traditional TDD one-way slots as well as sub-band full duplex (SBFD) slots and the corresponding antenna array configuration of a base station in accordance with an aspect of the disclosure.

An example slot format for legacy TDD and SBFD communication is shown in FIG. 1B. The first slot (SLOT 1) is a legacy TDD slot that is dedicated to downlink (DL) transmissions. The first slot may thus be designated as a DL TDD slot. It will be appreciated that DL transmissions may be divided into data and control transmissions channels as known in the 5G NR arts. The two arrays in the gNB (Array 1 and Array 2) are both used for downlink transmission (Tx(DL)) for SLOT 1. Similarly, the two arrays are both used for receiving an uplink transmission in a fourth slot (SLOT 4). In both the first slot and the fourth slot, the transmitted signal may occupy the entire (or some portion) of the slot frequency band. The second and third slots (SLOT 2 and SLOT 3) are SBFD slots. The first antenna array is thus dedicated to downlink transmission for the SBFD slots whereas the second antenna array is dedicated to uplink reception (Rx(UL)) for the SBFD slots. Note that neither the UL nor the DL in the SBFD slots may occupy the entire frequency resource range (the frequency band) for these slots. Instead, the UL occupies a central sub-band in the frequency band for the SBFD slots. The DL thus occupies a lower sub-band that ranges from the lower frequency for the frequency band up to a lowest frequency for the UL central sub-band. It will be appreciated however, that the sub-bands may be separated by a guard band. The DL also occupies an upper sub-band in the frequency band and extends from a greatest frequency for the UL central sub-band to a greatest frequency for the frequency band. This is advantageous as will be explained further herein with regard to minimizing or reducing UE-to-UE interference and transmit-to-receive self-interference at the base station. In one embodiment, the UL central sub-band may be symmetric about a center frequency for the SBFD slot. In such an embodiment, the bandwidth for the DL lower sub-band and the DL upper sub-band would be equal. However, in alternative embodiments, the DL lower sub-band bandwidth may be different from the bandwidth for the DL upper sub-band. In some embodiments, the DL upper and lower sub-bands may each have a bandwidth that may vary as 10 MHz/20 MHz/30 MHz or 40 MHz depending upon the downlink data rate.

Figure 2:
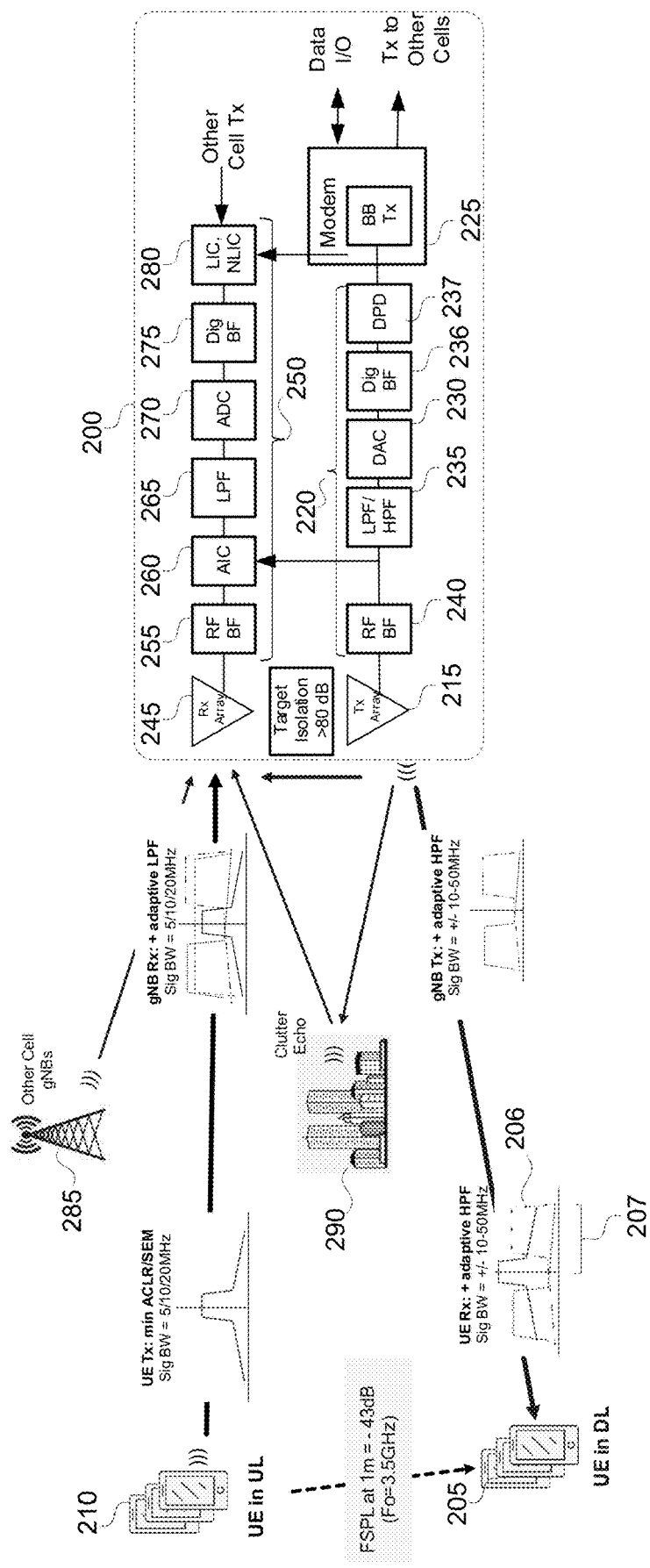
FIG. 2 illustrates a wireless communication system including a downlink UE receiving a SBFD downlink transmission while an uplink UE transmits an SBFD uplink transmission to the base station in accordance with an aspect of the disclosure.

An example base station (gNB) 200 in a cell is shown in FIG. 2. In this embodiment, the UEs are all half-duplex as discussed with regard to FIG. 1B such that in any given SBFD slot, a set or plurality of user equipments (UEs) 210 are dedicated (in one particular SBFD slot) to transmitting an UL signal to base station 200. Similarly, another set or plurality of UEs 205 in that SBFD slot are dedicated to receiving a DL signal from base station 200. Note that UEs 205 may function as a UE 210 in other SBFD slots. Similarly, a UE 210 may function as a UE 205 in other SBFD slots. Base station 200 is transmitting downlink symbols (e.g., OFDMA symbols) in the SBFD slot to each DL UE 205. There is thus the possibility of SBFD UE-to-UE interference if UL UE 210 is using the same central sub-band as used for the downlink transmissions to DL UE 205. For example, suppose that the frequency band for the SBFD slot (the slot frequency resource range) is 100 MHz. Depending upon the uplink bandwidth needs, the uplink bandwidth may be adjusted from 5 MHz to 10 MHz (or to 20 MHz) in some embodiments.

These uplink transmissions have the potential for substantial SBFD UE-to-UE interference. For example, suppose a UL UE 210 is merely 1 meter away from a DL UE 205. The free space path loss in the 3.5 GHz spectrum for such a separation is approximately 43 dB. Since the center frequency for the carrier bandwidth is shifted to DC (0 Hz) when the received signal at a DL UE 205 is down converted to baseband, a receive RF chain in DL UE 205 may utilize adaptive high-pass filtering to address the interference from UL UE 210. Similarly, UL UE 210 may use an adaptive center frequency to keep the UL transmission DC-centered within the carrier bandwidth.

A bandwidth for the upper and lower sub-bands for the DL transmission from base station 200 depends upon the bandwidth of the central sub-band for UL UEs 210. For example, suppose that the bandwidth for the central sub-band is 20 MHz. If the SBFD slot bandwidth is 100 MHz, the lower sub-band occupies a bandwidth spanning from the center frequency minus 10 MHz to the center frequency minus 50 MHz. Similarly, the upper sub-band occupies a bandwidth spanning from the center frequency plus 10 MHz to the center frequency plus 50 MHz. A DL UE 205 may thus apply a high-pass filter 206 after the received RF signal is down converted to baseband to select for the DL symbols and reject the UL interference from a UE 210. More generally, a DL UE 205 may use adaptive filtering (either high-pass, low-pass, or complex filtering) to reject the interference from a UL UE 210. For example, rather than transmit in a central sub-band, each UL UE 210 may be configured to utilize the lower half of the bandwidth of the SBFD slot. Base station 200 would then use the upper half of the bandwidth of the SBFD slot for the DL symbols. In such an embodiment, each DL UE 205 may apply a complex filter 207 to select for the upper half of the carrier bandwidth and reject the interference from the interfering UL UE 210. The base station filtering would then be symmetric so as to select for the lower half of the carrier bandwidth in such a complex filtering implementation.

The rejection or reduction of SBFD UE-to-UE interference may utilize the existing 3GPP framework for UE-to-UE cross-link interference (CLI) measurements to determine the presence of a jamming or interfering UE such as an UL UE 210. For example, each DL UE 205 may be configured with one or more Sounding Reference Signal (SRS) resources such as time-frequency resource(s), sequence(s), cyclic shift (s), periodicity, and so on to measure the UE-to-UE CLI. With regard to such measurements, SRS-Reference Signal Received Power (SRS-RSRP) and Received Signal Strength Indicator (RSSI) may be used as metrics for the CLI measurement. SRS-RSRP is a linear average of the power contributions of the SRS to be measured over the configured resource elements within the considered measurement frequency bandwidth in the timer resources in the configured measurement occasions. RSSI is a linear average of the total received power only in certain symbols (e.g., OFDM symbols) of the measurement time resource(s), in the measurement bandwidth and over the configured resource elements for the CLI measurement by the UE.

With the CLI measured so as to establish SBFD UE-to-UE interference, the downlink transmission may be shifted to a different sub-band frequency so as to better align the filtering in a DL UE 205 with the interfering symbols from an UL UE 210. Alternatively, a DL UE 205 may use more than one receive RF chain to recover the different resource elements in the various frequencies of the DL transmissions. One receive RF chain may thus be focused on certain resource blocks for the DL transmissions whereas another receive RF chain may be focused on the remaining resource blocks so as to improve the baseband filtering in a DL UE 205 and increase the rejection of the interfering UL transmissions. If a DL UE 205 is configured with knowledge of the direction to an interfering UL UE 210, the DL UE 205 may utilize spatial filtering techniques (e.g., minimum mean square error spatial filtering or like method) using multiple receive antennas. In addition, a DL UE 205 may be further configured to message base station 200 regarding the detection of the CLI. Base station 200 may then instruct the interfering UL UE 210 to address the interference by reducing the transmission power for the interfering UL UE 210 or to apply a transmit spatial null in the direction of the interfered DL UE 210. In addition, an interfering UL UE 210 may be instructed to use a different time division multiplex or frequency division multiplex pattern to minimize the CLI.

Base station 200 transmits the downlink symbols through a beamforming transmit antenna array 215. The beamforming may be entirely analog, entirely digital, or may be hybrid in both base station 200 and in the UEs. It will be assumed herein that hybrid beamforming is used due to its efficient utilization of the limited number of baseband-to-RF transmit chains in base station 200. A single transmit RF chain 220 is shown for illustration clarity. Each transmit RF chain 220 includes one or more mixers (not illustrated) for up converting the corresponding baseband signal to RF. A baseband modem 225 includes a baseband transmitter (BB Tx) for generating the baseband signal for each transmit RF chain. Prior to analog conversion in a digital-to-analog converter (DAC) 230, a digital beamforming weight 236 is applied to the baseband signal. The baseband signal may also be pre-distorted according to a digital pre-distortion (DPD) 237 prior to the analog conversion to correct for non-linearities in the transmit RF chain 220. The analog signal from DAC 230 is filtered by a high-pass filter 235 before being phased by a phase-shifter 240 to perform RF beamforming (RF BF). This filtering 235 may be adaptive to minimize interference with the simultaneous uplink transmissions from the UL UEs 210. Referring again to FIG. 1B, the sub-band assignment for the SBFD slots (SLOT 2 and SLOT 3) may be changed such that the UL transmission would occupy the lower sub-band and the upper sub-band whereas the DL transmission would occupy the central sub-band. In such an implementation, filter 235 in transmit RF chain 220 may be a high-pass filter whereas a filter 265 in a receive RF chain 250 may be a low-pass filter.

In base station 200, each transmit RF chain 220 drives a corresponding sub-array of antennas (discussed further below) within the transmit antenna array 215. One transmit RF chain 220 and corresponding sub-array of antennas may thus be beamforming to a first DL UE 205 whereas another transmit RF chain and corresponding sub-array of antennas may be beamforming to a second DL UE 205 in a multiple-in-multiple-out (MIMO) fashion. Given the number of antennas that may be utilized in base station 200, the resulting MIMO may be denoted as massive MIMO. In some embodiments, each individual antenna includes a first polarization port and a second polarization port. In a horizontal/vertical polarized embodiment, the first polarization port may be a vertically-polarized port whereas the second polarization port may be a horizontally-polarized port. Alternatively, a first polarization port may be a positive 45 degree (+45°) polarization port whereas a second polarization port may be a negative 45 degree (−45°) polarization port.

Base station 200 receives the UL signal through a receive antenna array (RX array) 245. Analogous to the transmit RF chains, base station 200 includes a plurality of receive RF chains 250. Each receive RF chain 250 functions to down convert a received RF signal from its corresponding sub-array of antennas in receive antenna array 245 from RF to baseband. For illustration clarity, only a single receive RF chain 250 is shown in FIG. 2. Each receive RF chain 250 and corresponding sub-array of antennas may be beamformed to receive the UL transmissions from a corresponding one of the UL UEs 210 in a massive MIMO fashion. A phase shifter 255 phase-shifts the received RF signal to perform analog beamforming (RF BF). To address self-interference, an analog interference cancellation circuit 260 may be included to subtract an interfering downlink component from the analog phase-shifted RF signal from phase-shifter 255. A low-pass filter 265 low-pass filters the analog phase-shifted RF signal to select for the uplink transmission. An analog-to-digital converter (ADC) 270 converts the filtered RF signal from low-pass filter 265 to form a received baseband signal that is adjusted according to a digital beamforming weight 275. The self-interference from the downlink transmission as well as from an interfering adjacent base station 285 or a clutter echo from nearby scatterers 290 may be addressed at baseband through a linear interference cancellation (LIC) and/or a non-linear interference cancellation (NLIC) technique 280. In addition, clutter from scatterers 290 and interference from adjacent base station 285 may be reduced through beamforming at base station 200. Due to a combination of the isolation between receive array 245 and transmit array 215, the isolation of the received DL signal using a low-pass filter 265, and the interference cancellation 280, the reception at base station 200 of the UL may incur a relatively small and acceptable amount of desense. The target isolation may be greater than or less than 80 dB in alternative implementations.

Figure 3:
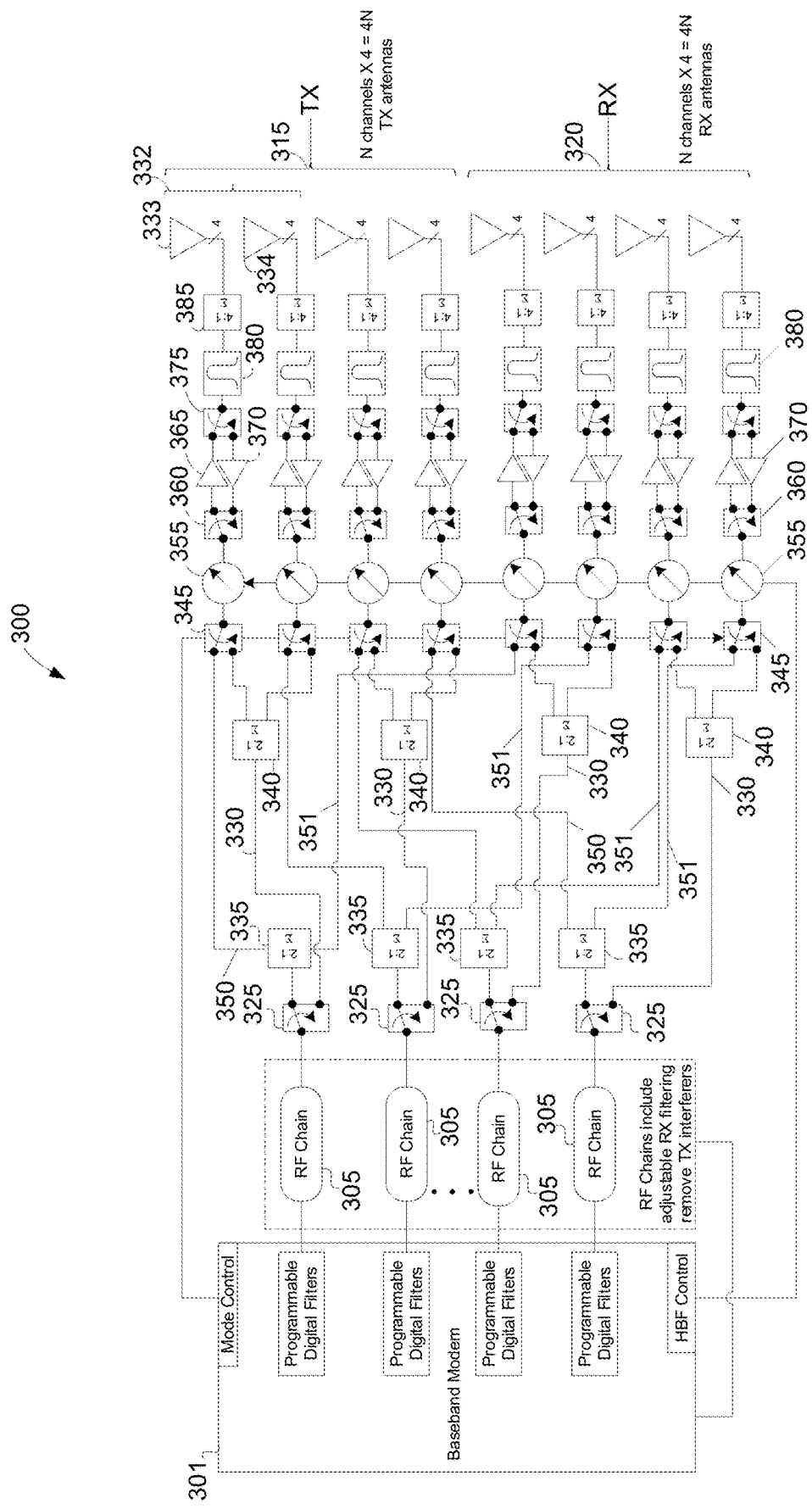
FIG. 3 illustrates the transmit and receive paths for an SBFD base station with 4:1 hybrid beamforming in accordance with an aspect of the disclosure.

An example base station 300 is shown in more detail in FIG. 3. Base station 300 includes a plurality of (N+1) RF chains ranging from a zeroth RF chain 305 to an Nth RF chain 305, N being a positive integer. Each RF chain 305 includes both a transmit RF chain and a receive RF chain such as discussed for FIG. 2. Base station 300 also includes a first array 315 of antennas and a second array 320 of antennas. Depending upon whether a TDD slot is dedicated to uplink or downlink, both arrays 315 and 320 may be dedicated accordingly. Thus, for a dedicated downlink TDD slot, both first array 315 and second array 320 may be used for transmission of DL RF signals from corresponding transmit RF chains. Similarly, both first array 315 and second array 320 may be used to receive UL RF signals for a dedicated uplink TDD slot. But the function of the first array 315 and second array 320 is bifurcated for a SBFD slot. For example, first array 315 may then be dedicated to transmitting (TX) whereas second array 320 may be dedicated to receiving (RX). Although first array 315 may be used as a receiving array in a TDD UL slot, it is also denoted herein as a transmit array 315 as that is its function during an SBFD slot. Similarly, although second array 320 may be used as a transmit array in a TDD DL slot, it is also denoted herein as a receive array 320 as that is its function in an SBFD slot. To accommodate both TDD and SBFD operation, each RF chain is switched through a RF switch 325. In a TDD slot, a first throw of each RF switch 325 selects for a corresponding TDD transmission channel or path 330. But in an SBFD slot, a second throw of each RF switch 325 selects for a corresponding SBFD receive channel or path 351 or a SBFD transmit channel or path 350. Note that a 2:1 splitter/combiner 335 is shown in FIG. 3 to split and combine the corresponding SBFD receive channel 351 and SBFD transmit channel 350. But it will be appreciated that each splitter/combiner 335 is conceptual in that each transmit RF chain and receive RF chain has its own RF switch 325. The second throw of each RF switch 325 for a receive RF chain thus selects for a corresponding SBFD receive channel 351. Similarly, the second throw of each RF switch 325 for a transmit RF chain selects for a corresponding SBFD transmit channel 350. Since each RF chain 305 includes a separate transmit RF chain and a separate receive RF chain, there are actually two RF switches 325 for each RF chain 305, just one is shown per RF chain 305 in FIG. 3 for illustration clarity.

The ability to select between SBFD and TDD operation raises the following issue. During TDD operation, each RF chain 305 corresponds to a TDD sub-array in one of the first array 315 and the second array 320. For example, in an UL TDD slot, only the transmit RF chain in a given RF chain 305 functions whereas the corresponding receive RF chain does not contribute. Conversely, in a DL TDD slot, only the receive RF chain in a given RF chain 305 functions whereas the corresponding transmit RF chain does not contribute. For example, the zeroth RF chain 305 functions in a TDD slot to either transmit or receive over a corresponding TDD sub-array 332. Since there are (N+1) RF chains, there are (N+1) corresponding TDD sub-arrays 332 across the transmit and receive arrays 315 and 320. If the RF chains used the same TDD sub-array assignment in an SBFD slot as used during TDD operation, only one-half of the transmit RF chains would transmit over transmit array 315 and one-half of the receive RF chains would receive over receive array 320. There is thus a three dB loss of power for both transmit and receive in such a RF chain configuration. To prevent this power loss, the RF-chain-to-sub-array correspondence is changed for SBFD operation so that all the transmit RF chains may transmit through the TX array 315 and so that all the receive RF chains may receive through the RX array 320. Each TDD sub-array 332 of antennas is divided into a first SBFD sub-array 333 of antennas and a second SBFD sub-array 334 of antennas. Since there are (N+1)/2 TDD sub-arrays 332 in transmit array 315, there is a total of (N+1)/2 first SBFD sub-arrays 333 and (N+1)/2 second SBFD sub-arrays 334 in transmit array 315. One-half of the transmit RF chains thus may transmit though a corresponding first SBFD sub-array 333 in transmit array 315 on a one-to-one basis. Similarly, a remaining one-half of the transmit RF chains may be assigned on a one-to-one basis to transmit through a corresponding second SBFD sub-array 334 in transmit array 315. There is thus no 3 dB loss for transmission of the UL in an SBFD slot. Receiving the DL is similar in that one-half of the RF chains may each receive from a corresponding first sub-array 333 in receive array 320 on a one-to-one basis. Similarly, the remaining one-half of the RF chains may each receive from a corresponding second sub-array 334 in receive array 320 on a one-to-one basis. There is thus no 3 dB loss for receiving the UL in an SBFD slot. Operation by base station 300 during an SBFD slot is also referred to herein as an SBFD mode of operation whereas operation in a TDD slot is also referred to herein as a TDD mode of operation.

Since each RF chain 305 corresponds with a SBFD sub-array (333 or 334) in transmit array 315 and there are (N+1) RF chains, transmit array 315 is formed by (N+1)/2 first SBFD sub-arrays 333 and (N+1)/2 second SBFD sub-arrays 334. Similarly, there are (N+1)/2 first SBFD sub-arrays 333 and (N+1)/2 second sub-arrays 334 in receive array 320. As noted earlier, FIG. 3 is showing just a single RF switch 325 for each RF chain 305 for illustration clarity. The RF switch 325 for a receive RF chain may thus select for a receive SBBD channel 351. Conversely, the RF switch 325 for a transmit RF chain may select for a transmit SBFD channel 350.

During TDD operation, first array 315 and second array 320 are used in common for uplink or for downlink. Each RF switch 325 then selects for the corresponding TDD channel 330. Since there are (N+1) RF chains, there are thus (N+1)/2 corresponding TDD sub-arrays 332 for first array 315 and (N+1)/2 TDD sub-arrays 332 in second array 320 for TDD operation. In base station 300, each TDD sub-array 332 includes eight antennas but it will be appreciated that the number of antennas in each TDD sub-array 332 may be greater than or smaller than eight in alternative embodiments. During TDD downlink operation in a TDD DL slot, a transmit RF signal on TDD channel 330 for each transmit RF chain is split by a 2:1 splitter/combiner 340 that drives two RF switches 345. Analogous to RF switches 325, one throw of each RF switch 345 selects for a corresponding TDD channel 330 whereas another throw of each RF switch 345 selects for a corresponding SBFD channel In particular, each RF switch 345 for the transmit array 315 may select for a transmit SBFD channel 350 during an SBFD slot. Similarly, each RF switch 345 for the receive array 320 may select for a receive SBFD channel 351 during an SBFD slot.

Base station 300 is configured for 4:1 hybrid beamforming. The number of RF chains (and corresponding digital paths in a baseband modem 301) is then one-fourth the total number of antennas in the combination of TX array 315 and RX array 320. Each SBFD sub-array 333 or 334 has four antennas such that each sub-array 333 or 334 receives the same beamforming. There is thus a phase-shifter 355 for each sub-array 333 or 334. Each phase-shifter 355 connects to a corresponding transmit/receive RF switch 360. If a sub-array 333 or 334 is transmitting, the corresponding transmit/receive RF switch 360 selects for an input to a corresponding power amplifier 365. Conversely, if a sub-array 333 or 334 is receiving, the corresponding transmit/receive RF switch 360 selects for an output of a low-noise amplifier (LNA) 370. Each power amplifier/LNA pair also connects to another transmit/receive RF switch 375. During transmit, each transmit/receive RF switch 375 connects the output of the corresponding power amplifier 365 to a bandpass filter 380 to drive the corresponding sub-array 333 or 334 through a 4:1 splitter/combiner 385. In a receive mode, splitter/combiner 385 combines the received RF signals from the corresponding sub-array 333 or 334. The combined received RF signal then is filtered by bandpass filter 380, switched through transmit/receive switch 375, amplified by the corresponding low-noise amplifier 370, switched through transmit/receive switch 360 and phase-shifted in phase shifter 355 according to the corresponding analog beamforming weight. The received signal's path from phase-shifter 355 depends upon whether the TDD or SBFD mode is active. In a TDD mode, RF switch 345 selects for splitter/combiner 340 so that the received RF signal for the TDD sub-array can be formed. From splitter/combiner 340, the combined received RF signal then propagates over TDD channel 330 and through RF switch 325 so that it may be processed in the corresponding receive RF chain. In an SBFD mode, RF switch 345 (for a sub-array 333 or 334 in receive array 320) selects for receive SBFD channel 351 so that the received RF signal may propagate through the corresponding RF switch 325 and be received in the corresponding receive RF chain.

The transmit RF chain in each RF chain 305 receives a digital baseband signal from the baseband modem 301 that is upconverted into a corresponding RF transmit signal. Similarly, the receive RF chain in each RF chain 305 down converts a received RF signal to provide a corresponding digital baseband signal to baseband modem 301. Referring again to FIG. 2, the example receive RF chain 250 includes a low-pass filter 265 so that the DL signals in the lower and upper sub-bands may be filtered out as discussed with regard to FIG. 1B. In particular, a center frequency (or approximately a center frequency for the UL central or mid subband is down converted to DC by receive RF chain 250. The down converted DL signals from the upper and lower sub-bands are thus relatively high-frequency signals as compared to the down converted UL signals such that low-pass filter 265 may pass the down converted UL signals and block the down converted DL signals. Referring again to FIG. 3, additional filtering to achieve this separation between the UL and DL signals may be further performed in the digital domain in baseband modem 301 using, for example, programmable digital filters. Baseband modem 301 controls the various RF switches through a mode controller interface. In addition, baseband modem 301 controls the phase-shifters 355 using a hybrid beamforming (HBF) control interface.

Figure 4A:
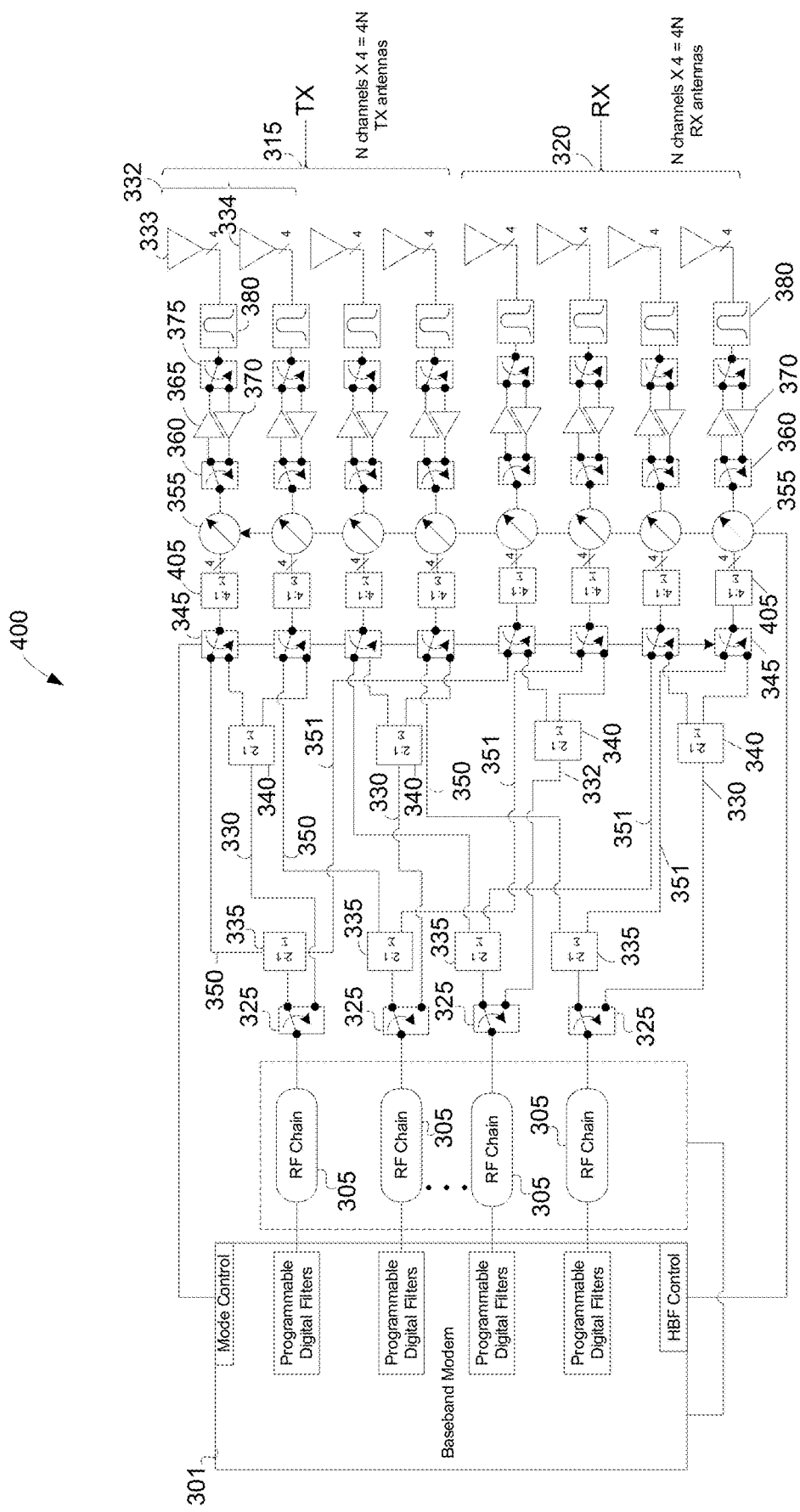
FIG. 4A illustrates the transmit and receive paths for an SBFD base station with full hybrid beamforming and 4:1 signal combining in accordance with an aspect of the disclosure.

It will be appreciated that the 4:1 hybrid beamforming discussed for base station 300 may be modified in alternative embodiments. For example, a base station 400 shown in FIG. 4A has full hybrid beamforming. Without any signal combining, there would then be a one-to-one correspondence between each RF chain and corresponding antenna element. Such a one-to-one correspondence may then lead to an inordinate number of RF chains (and corresponding digital paths in the baseband modem 301). To reduce the complexity, each RF chain 305 may be associated with a 4:1 splitter/combiner 405. The transmit RF chain portion of an RF chain 305 generates a transmit RF signal that is split four ways by the respective 4:1 splitter/combiner 405 to drive four corresponding antenna elements. Each splitter/combiner 405 also functions to combine four received RF signals from four corresponding antenna elements to produce a combined received RF signal that is eventually received by a corresponding receive RF chain. There is thus a 4:1 reduction from the number of antenna elements to the number of RF chains 305 by the 4:1 splitting and combining.

Since the beamforming is 1:1, there is a phase-shifter 355 for each individual antenna element. The combination of a phase shifter 355, RF switch 360, amplifiers 365 and 370, and bandpass filter 380 is repeated four times for each corresponding 4:1 splitter/combiner 405. For illustration clarity, only one of these four element combinations is shown for each 4:1 splitter/combiner 405. Each 4:1 splitter/combiner 405 intervenes between a respective RF switch 345 and a respective phase-shifter 355 (note that there are actually four respective phase-shifters 355 due to the 4:1 combining and 1:4 splitting by 4:1 splitter/combiner 405). In a transmit mode, each 4:1 splitter/combiner 405 functions to split the transmit RF signal from the corresponding RF switch 345 into four separate transmit RF signals. In a receive mode, each 4:1 splitter/combiner 405 functions to combine the four receive RF signals from the corresponding group of four phase-shifters 355 into a combined RF receive signal. The remaining components are as discussed with regard to base station 300. It will be appreciated that the number of phase-shifters 355 in each group in base station 400 depends upon the number of antennas in each SBFD sub-array. This number may be greater or smaller than four in alternative embodiments. The number of antennas in each SBFD sub-array determines the number of phase-shifters 355 and the order of splitter/combiners 405.

Figure 4B:
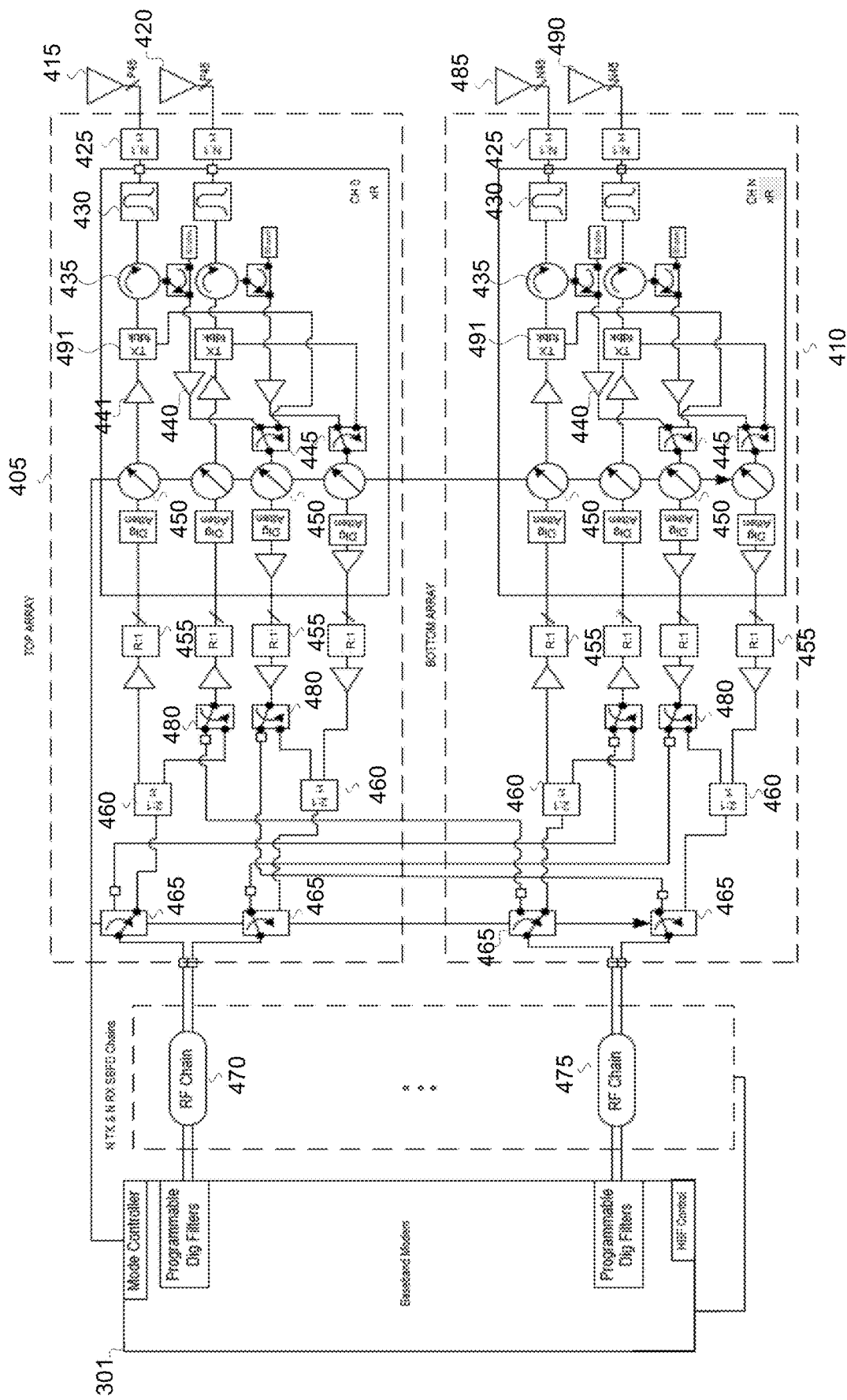
FIG. 4B illustrates the transmit and receive paths for an SBFD base station with an N:1 hybrid beamforming and an R:1 signal combining in accordance with an aspect of the disclosure.

As the number of antennas increases, a full beamforming with some combining as discussed for base station 400 or even a 4:1 beamforming with no combining as discussed for base station 300 may lead to an excessive number of RF chains and corresponding digital paths at baseband modem 301. However, it is advantageous in massive MIMO to have a relatively large number of antennas so that multiple users may be supported, each user being supported by a corresponding fraction of the antennas. As the number of antennas increases, the number of supported users may increase accordingly. To provide a relatively large number of antennas in both of the arrays, a base station 450 is shown in FIG. 4B with R:1 combining and N:1 beamforming, R and N each being positive integers. The reduction from the number of antenna elements to the number of RF chains is thus a factor of (R*N) for base station 450. Base station 450 includes a top array 405 of antennas that functions as a receive array 405 in SBFD operation but may function as either transmit or receive in TDD operation. Similarly, a bottom array 410 of antennas functions as a transmit array in SBFD operation but may function as either transmit or receive in TDD operation. For illustration clarity, only a single instance of a channel 0 (CH 0) is shown in top array 405 but it will be appreciated that channel 0 may be instantiated R times due to the 1:R splitting and R:1 combining. Each instantiation of channel 0 has a first sub-array 415 of antennas and a second sub-array of antennas 420. Each sub-array 415 and 420 includes a plurality of N antennas that are coupled to channel 0 through a respective N:1 combiner/splitter 425. Upon filtering in a respective bandpass filter 430, the received and combined RF signal from a sub-array 415 or 420 may switched through a circulator 435 and an associated switch to a respective low-noise amplifier 440. The resulting amplified received RF signal may then be phase-shifted in a respective phase-shifter 450 before attenuated in a digital attenuator and amplified again. Since there are R instantiations of channel zero, there are R resulting RF signals that may be combined in a respective splitter/combiner 455. During an DL TDD mode of operation, the received RF signals from sub-arrays 415 and 420 are combined in a 2:1 combiner 460 and shifted through an RF switch 465 to the receive RF chain portion of an RF chain 470 that also includes a transmit RF chain.

Each RF switch 465 has two throws. A first throw selects for a TDD path such as just discussed. In a second throw, each RF switch 465 selects for an SBFD path. During an SBFD slot, a receive RF chain in RF chain 470 receives an RF signal from sub-array 420 due to a routing through a respective RF switch 445 and 465. In the SBFD slot, the received RF signal from sub-array 415 passes through a respective RF switch 445 and a respective RF switch 465 to be received by a receive RF chain in an RF chain 475. A similar splitting of a TDD sub-array occurs in TX array 410 with regard to a sub-array 485 of antennas and a sub-array 490 of antennas. During an UL TDD slot, a transmit RF chain in RF chain 475 drives through a respective switch 465 and 2:1 splitter 460 to drive both sub-arrays 485 and 490 in common as a single TDD sub-array. During transmit, each transmit RF signal is amplified by a plurality of amplifiers 441. In SPFD operation, RF chain 470 drives sub-array 490 whereas RF chain 475 drives sub-array 485. More generally, all the transmit RF chains drive corresponding sub-arrays in TX array 410 whereas all the receive RF chains receive from corresponding sub-arrays in RX array 405 during SBFD operation to prevent a 3 dB loss of power.

To provide feedback information on signal strength during transmission and also support digital pre-distortion, each sub-array 415, 420, 485, and 490 is associated with a respective transmission feedback circuit (TX fdbk) 491 that samples the transmitted signal strength. The resulting feedback information may then be routed through a respective switch 445 and 465 to a receive RF chain so that the transmitted signal strength may be determined.

In base stations 300, 400, and 450 the plurality of RF switches such as switches 325, 345, 465, and 480 may be denoted as a switching array that is configured to change the mapping from a baseband path in mode 301 to a given sub-array of antennas depending upon whether a slot is a TDD slot or an SBFD slot. It will be appreciated that this switching matrix may instead be performed in the digital instead of the RF domain to provide this sub-array mapping ability.

An example transmit antenna array and example receive antenna array will now be discussed in more detail. As discussed regarding FIG. 2, it is proposed that 80 dB or greater of isolation between the two arrays is sufficient for successful SBFD operation. Each array of antennas may be arranged according to rows and columns. The following discussion will assume that each antenna is a patch antenna, but it will be appreciated that other antenna topologies such as a dipole or a fractal antenna may be used in alternative embodiments. Similarly, it will be assumed in the following discussion that the transmit array and the receive array are each planar arrays that are coplanar with each other but this coplanarity may be broken in alternative embodiments.

Figure 5:
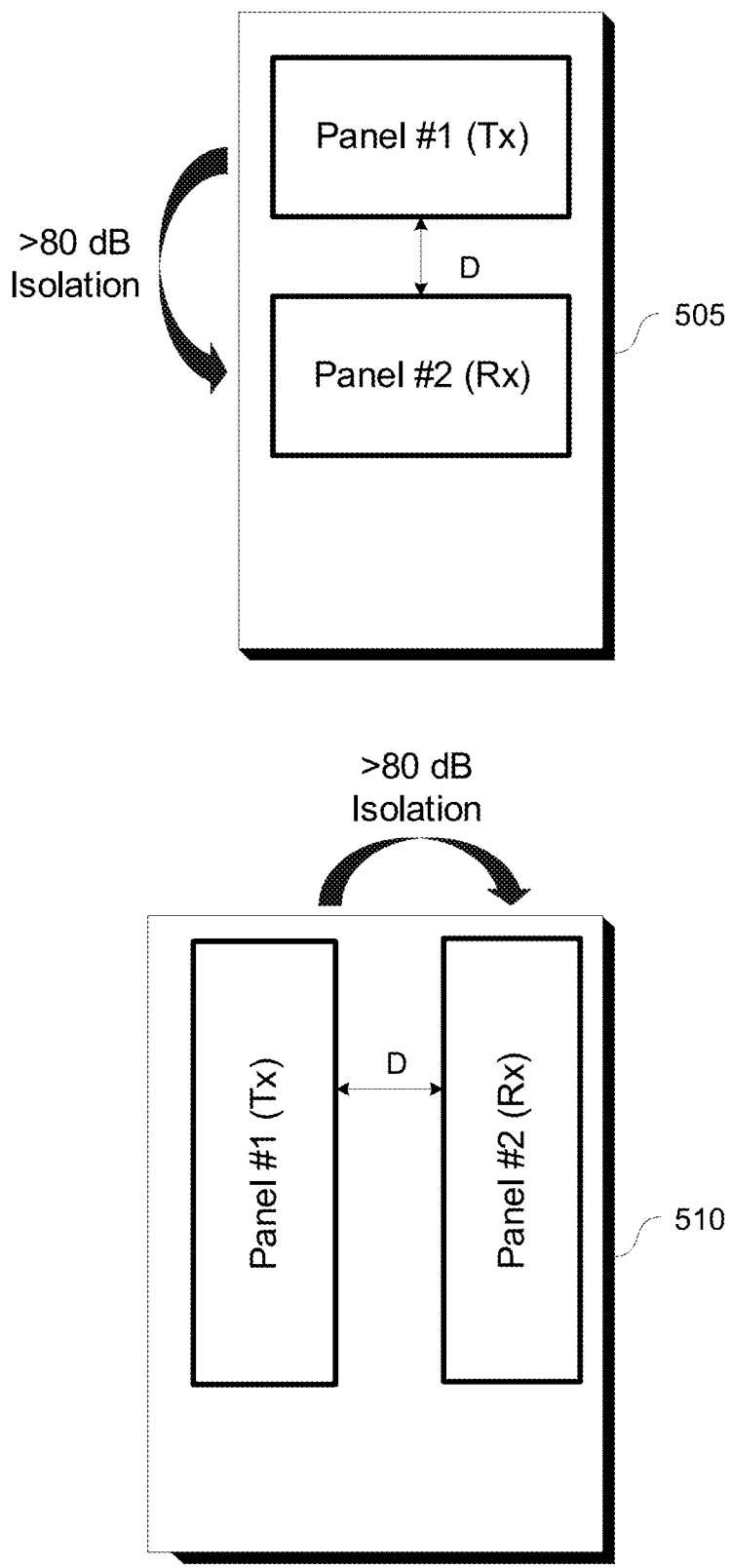
FIG. 5 illustrates two example arrangements of the transmit and receive antenna arrays on a circuit board substrate for an SBFD base station in accordance with an aspect of the disclosure.

Some sample coplanar embodiments are shown in FIG. 5 in which the antennas elements are arranged by rows and columns. In a first row-dominated embodiment 505, the rows are longer than the columns whereas in a second column-dominated embodiment 510, the columns are longer than the rows. Regardless of the array orientation, there is a minimum separation D that separates the receiving and transmitting arrays. In a row-dominated arrangement such as first arrangement 505, the minimum separation is between a center of a patch antenna in the bottom row for the upper transmitting array (Panel #1 (Tx)) to a center of a corresponding patch antenna in the upper row for the lower receiving array (Panel #2 (Rx)). In a column-dominated arrangement such as second arrangement 510, the minimum separation is from a center of a patch antenna in a last column in the transmit array to a center of a corresponding patch antenna in the first column in the receive array. To address the loss of gain from limiting the transmit and receive to respective arrays rather than using the entire array as is conventional in TDD operation, the spacing between the antenna elements in the row and column directions may be greater than one-half wavelength for the desired spectrum.

Figure 6:
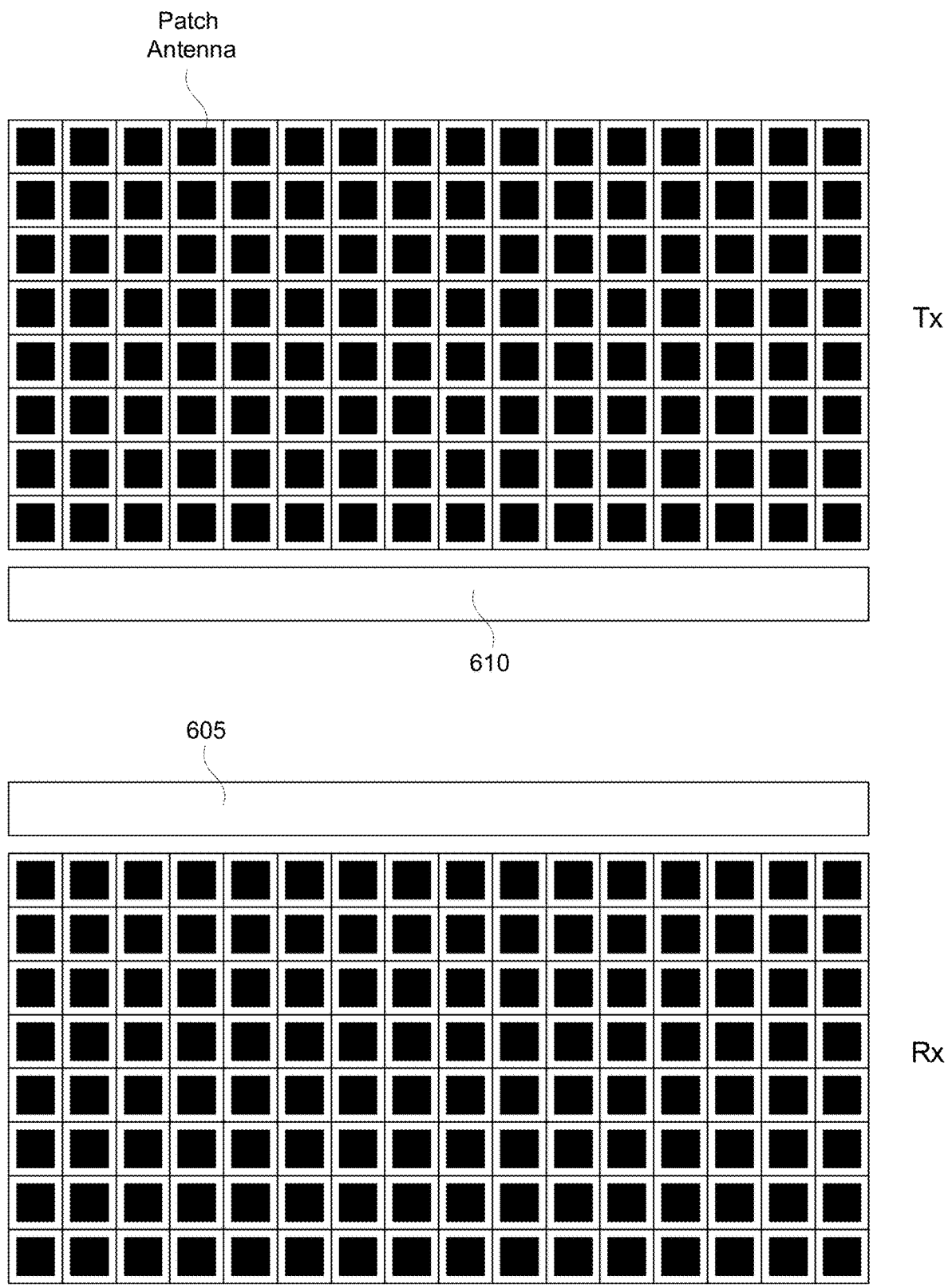
FIG. 6 illustrates a transmit array and a receive array isolated through a pair of conductive first isolation enhancers in accordance with an aspect of the disclosure.

The physical separation D may become unworkably large to alone provide the desired 80 dB or greater isolation between the transmit and receive arrays. For example, at 3.5 GHz, the physical separation D would need to be 70 meters to provide 80 dB of isolation. Since such a physical separation is difficult to achieve in any real-world base station, it is proposed herein to use a considerably smaller separation of at least 20 centimeters such as 21.5 centimeters. Such a separation provides approximately 45 dB of isolation in a cross-polarized transmit to a receive configuration. For example, the transmit array may be horizontally polarized whereas the receive array may be vertically polarized. Alternatively, the receive array may have a positive 45-degree polarization (P45) whereas the transmit array may have a negative 45-degree polarization (N45). To achieve the desired isolation such as 80 dB, one or more conductive isolation enhancers are placed between the transmit and receive arrays. An example configuration with conductive isolation enhancers is shown in FIG. 6. The TX and RX arrays are row dominated so a conductive isolation enhancer 605 and a conductive isolation enhancer are both oriented in the row direction in the space between the two coplanar arrays. Conductive isolation enhancer 610 is adjacent the last row of antennas in the TX array whereas conductive isolation enhancer 605 is adjacent the first row of antennas in the RX array.

Figure 7:
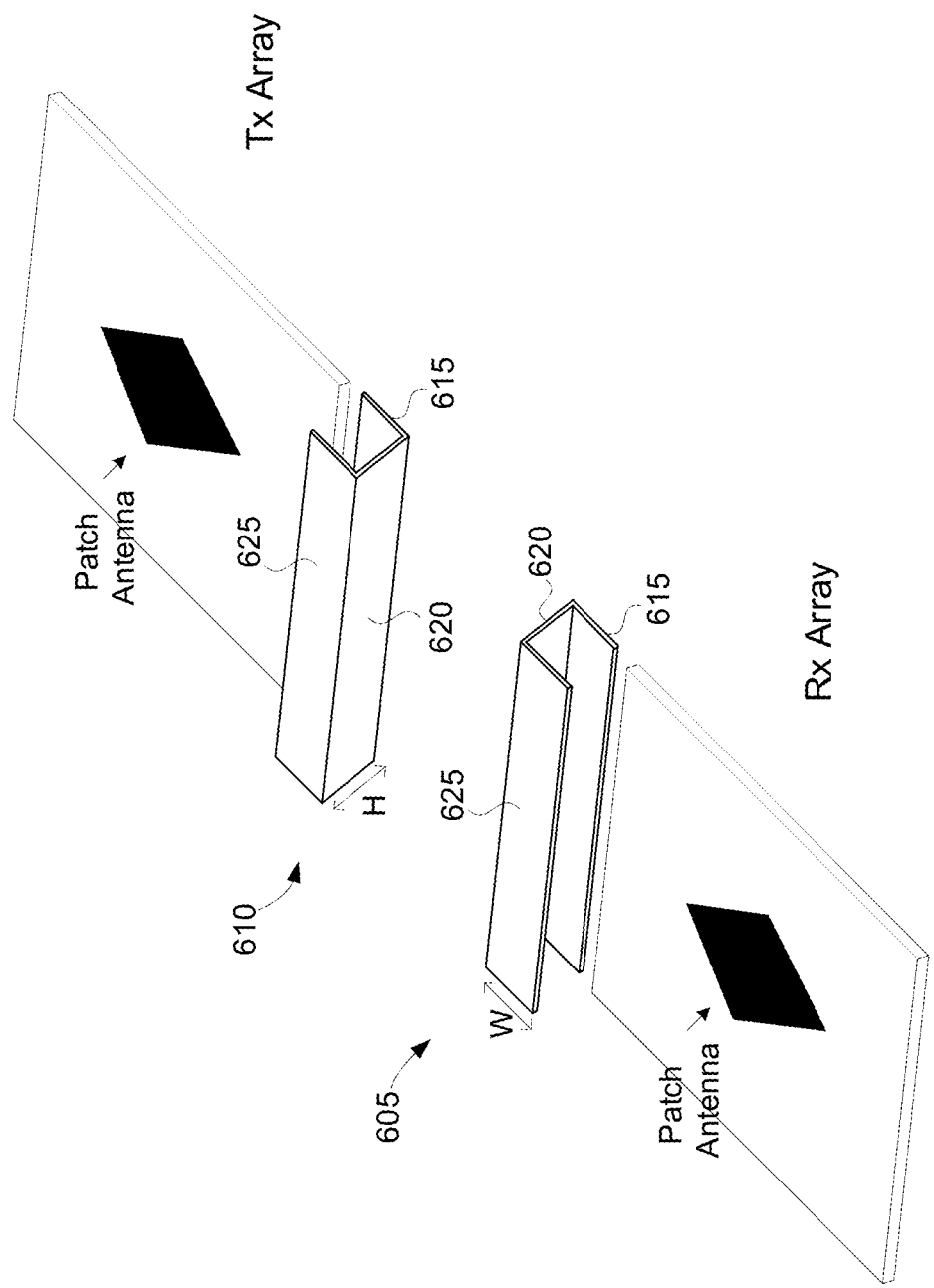
FIG. 7 illustrates a perspective view of a portion of the arrays and conductive first isolation enhancers of FIG. 6.
Figure 8:
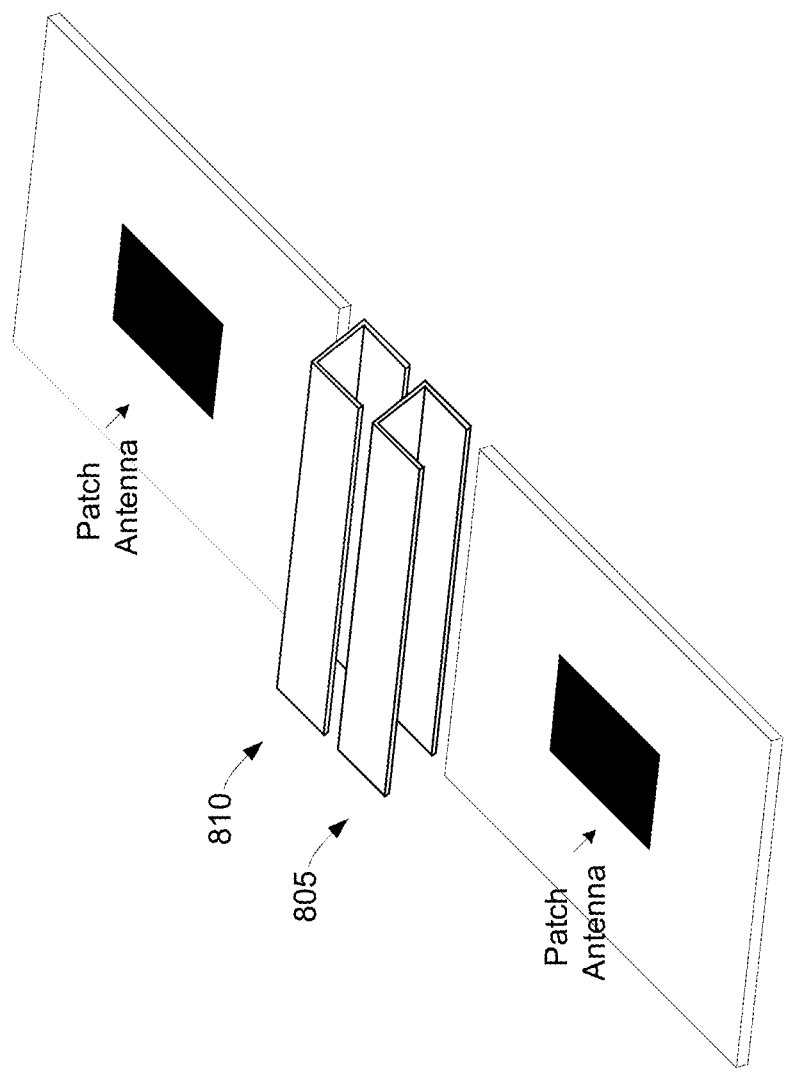
FIG. 8 illustrates a portion of a transmit and receive array isolated by a pair of conductive first isolation enhancers in which the pair faces towards the same array.

A portion of isolation enhancers 610 and 610 is shown in perspective view in FIG. 7. Each isolation enhancer has a U-shaped cross section. For example, isolation enhancer 605 has a first side 615 of the U-shape extending from the first row of the RX array. For illustration clarity, the RX array is represented by a single patch antenna. First side 615 is coplanar with the RX array and extends to a bottom portion 620 of the U-shape that is extends normally or orthogonally to the plane defined by the RX array (and by the TX array). A second side 625 of the U shape is arranged parallel to first side 615 and extends from bottom portion 620 toward the RX array. The result is the U-shape is open towards the RX array. Isolation enhancer 610 for the TX array is arranged similarly but has its U-shape open toward the TX array. To enhance the isolation, the patch antennas in the RX and TX arrays are arranged for +/−45° polarization. In alternative embodiments, one of the isolation enhancers may be omitted. Similarly, each isolation enhancer may be replaced by multiple isolation enhancers in some embodiments. Alternatively, the U-shape for each isolation enhancer may face towards the same array as shown in FIG. 8. A width W and a height H for each isolation enhancer is approximately a quarter wavelength for the center frequency in the desired spectrum (e.g., 3.5 GHz). To enhance the isolation, the patch antennas in the RX and TX arrays are arranged for +/−45° polarization.

Figure 9:
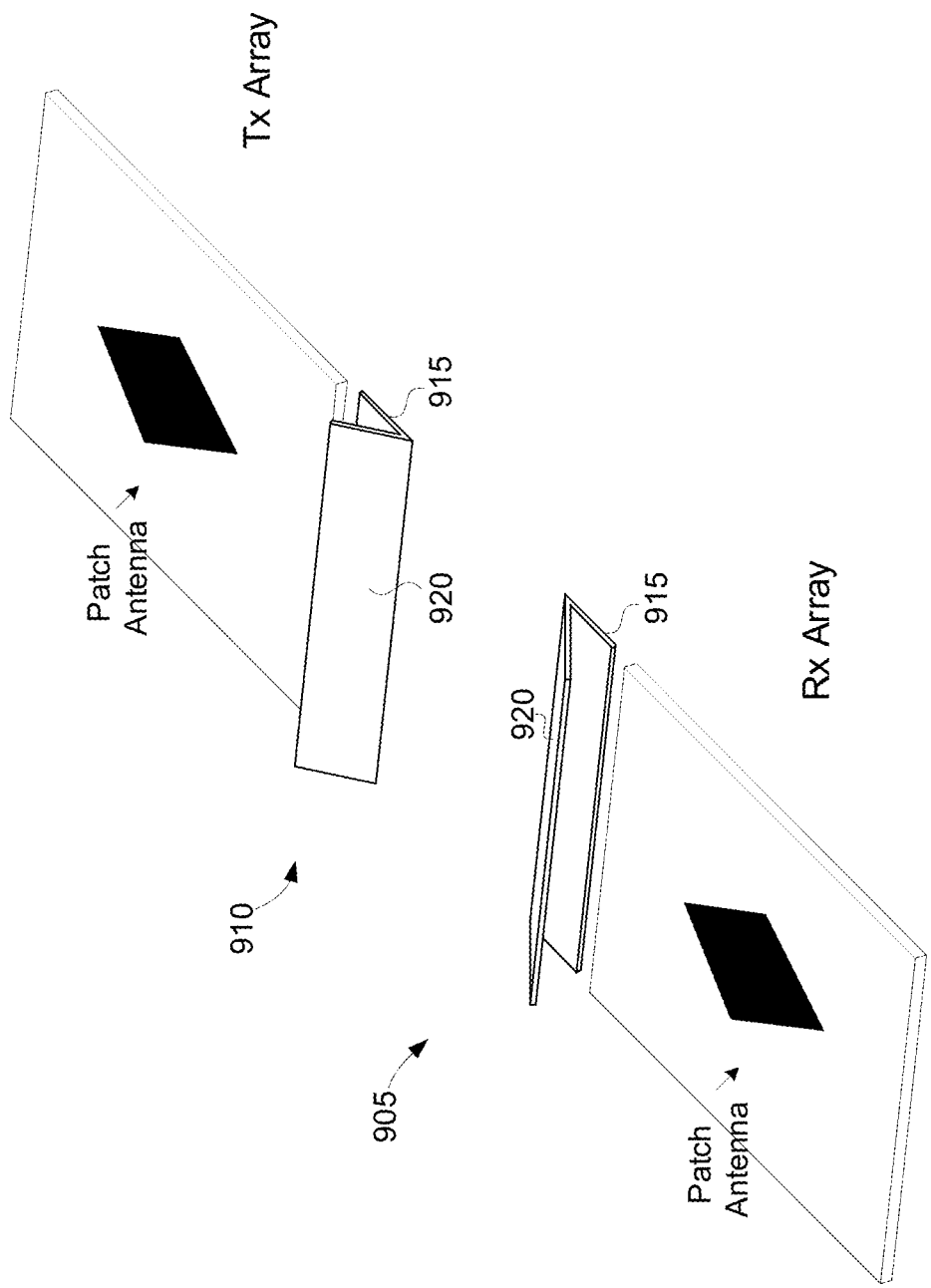
FIG. 9 illustrates a transmit array and a receive array isolated through a pair of conductive second isolation enhancers in accordance with an aspect of the disclosure.

A similar width W and height H for an RX array isolation enhancer 905 and an TX array isolation enhancer 910 may be achieved with an alternative configuration as shown in FIG. 9. Each isolation enhancer 905 and 910 has a planar bottom portion 915 that is analogous to bottom portion 620. But an upper portion of 920 is not projecting vertically from the planar bottom portion but at an acute angle to the plane defined by planar bottom portion 915. The resulting acute angle may vary depending upon the implementation but may be approximately 45 degrees in one example.

A method of operation for an SBFD base station will now be discussed with regard to the flowchart of FIG. 10. The method includes an act 1000 that occurs during a downlink time division duplex (DL TDD) slot and includes up converting a first baseband signal using a first RF chain to form a first DL radio frequency (RF) signal and transmitting the first DL RF signal from a first sub-array of antennas and from a second sub-array of antennas, the first DL RF signal occupying a frequency band. The DL TDD transmission over a TDD sub-array such as TDD sub-array 332 is an example of act 1000. The method also includes an act 1005 that occurs during an uplink (UL) TDD slot and includes receiving a first UL RF signal using the first sub-array of antennas and the second sub-array of antennas and down converting the first UL RF signal using the first RF chain to form a second baseband signal, the first UL RF signal occupying the frequency band. Receiving an UL TDD RF signal over a TDD sub-array such as TDD sub-array 332 is an example of act 1005. Finally, the method includes an act 1010 that occurs during a first sub-band-full-duplex slot and includes up converting a third baseband signal using the first RF chain to form a second DL RF signal and transmitting the second DL RF signal only from the first sub-array of antennas, the second DL RF signal occupying a lower sub-band and an upper sub-band in the frequency band, the lower sub-band being separated in frequency from the upper sub-band by a central sub-band in the frequency band. The transmission of an UL SBFD RF signal over a single SBFD sub-array such one of SBFD sub-arrays 333 or 334 is an example of act 1010.

It will be appreciated that many modifications, substitutions and variations can be made in and to the materials, apparatus, configurations and methods of use of the devices of the present disclosure without departing from the scope thereof In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A base station, comprising:
   a first array of antennas including a first sub-band full duplex (SBFD) sub-array of antennas;
   a second array of antennas including a second SBFD sub-array of antennas;
   a plurality of transmit RF chains including a first transmit RF chain configured to shift a baseband signal into an RF transmit signal;
   a plurality of receive RF chains including a first receive RF chain configured to shift a receive RF signal into a baseband signal;
   a first switch coupled to the first transmit RF chain, the first switch having an SBFD configuration in which the RF transmit signal from the first transmit RF chain is coupled only to the first SBFD sub-array of antennas and having a time division duplex (TDD) transmit configuration in which the RF transmit signal from the first transmit RF chain is coupled to both the first SBFD sub-array of antennas and to the second SBFD sub-array of antennas; and
   a second switch coupled to the second transmit RF chain, the second switch having an SBFD configuration in which the RF receive signal is coupled only from the second SBFD sub-array of antennas to the first receive RF chain and having a TDD receive configuration in which the RF receive signal is coupled from both the first SBFD sub-array of antennas and from the second SBFD sub-array of antennas to the first receive RF chain.

2. The base station of claim 1, wherein the first SBFD sub-array of antennas and the second SBFD sub-array of antennas each comprises four antennas.

3. The base station of claim 1, wherein the base station is further configured for an M:1 hybrid beamforming, M being a positive integer.

4. The base station of claim 3, wherein M equals four.

5. The base station of claim 1, wherein the base station is further configured for a full hybrid beamforming.

6. A base station, comprising:
   a first transmit RF chain;
   a first array of antennas including a first sub-band-full-duplex (SBFD) sub-array of antennas and a second SBFD sub-array of antennas;
   a first RF signal splitter and combiner; and
   a switching array configured to couple the transmit RF chain through the first RF signal splitter and combiner to both the first SBFD sub-array of antennas and to the second SBFD sub-array of antennas in a downlink time division duplex (DL TDD) mode of operation, the switching array being further configured to couple the first transmit RF chain to the first SBFD sub-array of antennas and not to the second SBFD sub-array of antennas in an SBFD mode of operation.

7. The base station of claim 6, further comprising:
   a first receive RF chain;
   a second array of antennas including a third sub-band-full-duplex (SBFD) sub-array of antennas and a fourth SBFD sub-array of antennas; and wherein the switching array is further configured to couple both the first SBFD sub-array of antennas and the second SBFD sub-array of antennas through the first RF signal splitter and combiner to the first receive RF chain during an uplink (UL) TDD mode of operation, the switching array being further configured to couple the first receive RF chain to the third SBFD sub-array of antennas during the SBFD mode of operation.

8. The base station of claim 7, further comprising:
a second transmit RF chain; and
a second receive RF chain;
a second RF signal splitter and combiner; and
wherein the switching array is further configured to couple the second transmit RF chain through the second RF signal splitter and combiner to both the third SBFD sub-array of antennas and to the fourth SBFD sub-array of antennas in the DL TDD mode of operation, the switching array being further configured to couple both the third SBFD sub-array of antennas and the fourth SBFD sub-array of antennas through the second RF signal splitter and combiner to the second receive RF chain in the UL TDD mode of operation.

9. The base station of claim 8, wherein the switching array is further configured to couple the second receive RF chain to the fourth SBFD sub-array of antennas during the SBFD mode of operation.

10. The base station of claim 6, wherein the first SBFD sub-array of antennas and the second SBFD sub-array of antennas each comprises a plurality of N antennas, N being a positive integer, the base station further comprising:
a first N:1 splitter and combiner configured to couple to the first SBFD sub-array of antennas; and
a second N:1 splitter and combiner configured to couple to the second SBFD sub-array of antennas.

11. The base station of claim 8, wherein the first array of antennas is separated from the second array of antennas by a separation of at least 20 centimeters.

12. The base station of claim 11, wherein the first array of antennas and the second array of antennas are arranged in a plane, the base station further comprising:
an isolation enhancer positioned between the first array of antennas and the second array of antennas, the isolation enhancer including a conductive bottom portion that is coplanar within the plane and including a conductive planar upper portion that projects from the plane.

13. The base station of claim 12, wherein the planar upper portion projects normally from the plane to define a height for the isolation enhancer that is approximately one quarter of a wavelength of a center frequency of a transmit RF signal of the base station.

14. The base station of claim 13, wherein the bottom portion has a width that is approximately one-quarter of the wavelength of the center frequency.

15. The base station of claim 12, wherein the planar upper portion projects at an acute angle from the plane to define a height for the isolation enhancer that is approximately one quarter of a wavelength of a center frequency of a transmit RF signal of the base station.

16. The base station of claim 15, wherein the bottom portion has a width that is approximately one-quarter of the wavelength of the center frequency.

17. A method for a base station, comprising:
during a downlink time division duplex (DL TDD) slot, up converting a first baseband signal using a first RF chain to form a first DL radio frequency (RF) signal and transmitting the first DL RF signal from a first sub-array of antennas and from a second sub-array of antennas, the first DL RF signal occupying a frequency band;
during an uplink (UL) TDD slot, receiving a first UL RF signal using the first sub-array of antennas and the second sub-array of antennas and down converting the first UL RF signal using the first RF chain to form a second baseband signal, the first UL RF signal occupying the frequency band; and
during a first sub-band-full-duplex (SBFD) slot, up converting a third baseband signal using the first RF chain to form a second DL RF signal and transmitting the second DL RF signal only from the first sub-array of antennas, the second DL RF signal occupying a lower sub-band and an upper sub-band in the frequency band, the lower sub-band being separated in frequency from the upper sub-band by a central sub-band in the frequency band.

18. The method of claim 17, further comprising:
during a second SBFD slot, receiving a second UL RF signal using the first sub-array of antennas and down converting the second UL RF signal using the first RF chain to form a fourth baseband signal, the second UL RF signal occupying the central sub-band.

19. The method of claim 18, further comprising:
during the second SBFD slot, receiving a third UL RF signal using the second sub-array of antennas and down converting the third UL RF signal using a second RF chain to form a fifth baseband signal, the third UL RF signal occupying the central sub-band.

20. The method of claim 17, wherein transmitting the first DL RF signal from the first sub-array of antennas and from the second sub-array of antennas comprises:
splitting the first DL RF signal in a splitter to form a plurality of RF signals,
phase-shifting each RF signal in the plurality of RF signals according to a beamforming command to form a plurality of phase-shifted RF signals;
and distributing the plurality of phase-shifted RF signals to the first sub-array of antennas and to the second sub-array of antennas.

21. The method of claim 18, wherein the down converting of the second UL RF signal using the first RF chain to form the fourth baseband signal further comprises low-pass filtering the fourth baseband signal.

* * * * *